US010952913B2

(12) United States Patent
Dalbert

(10) Patent No.: US 10,952,913 B2
(45) Date of Patent: Mar. 23, 2021

(54) CLADDING PROTECTION UNITS FOR TELESCOPING COLUMNS AND ADJUSTABLE SUPPORT APPARATUSES

(71) Applicant: Trumpf Medizin Systeme GmbH + Co. KG, Puchheim (DE)

(72) Inventor: Heinz Dalbert, Awendaw, SC (US)

(73) Assignee: TRUMPF MEDIZIN SYSTEME GMBH + CO. KG, Puchheim (DE)

( * ) Notice: Subject to any disclaimer, the term of this patent is extended or adjusted under 35 U.S.C. 154(b) by 270 days.

(21) Appl. No.: 15/953,552

(22) Filed: Apr. 16, 2018

(65) Prior Publication Data

US 2018/0311101 A1    Nov. 1, 2018

Related U.S. Application Data

(60) Provisional application No. 62/491,696, filed on Apr. 28, 2017.

(51) Int. Cl.
*A61G 13/10* (2006.01)
*A61G 13/06* (2006.01)
*F16B 1/00* (2006.01)

(52) U.S. Cl.
CPC ............. *A61G 13/10* (2013.01); *A61G 13/06* (2013.01); *F16B 1/00* (2013.01); *A61G 2203/72* (2013.01); *F16B 2001/0035* (2013.01)

(58) Field of Classification Search
CPC .. A61G 13/10; A61G 2203/72; A61G 13/101; F16B 1/00; F16B 2001/0035
See application file for complete search history.

(56) References Cited

U.S. PATENT DOCUMENTS

| 5,528,782 A | 6/1996 | Pfeuffer et al. |
| 7,865,985 B2 | 1/2011 | Revenus |
| 9,233,042 B1 | 1/2016 | Freude |

(Continued)

FOREIGN PATENT DOCUMENTS

| DE | 3919207 C1 | 11/1990 |
| WO | 2015150535 A1 | 10/2015 |
| WO | 2016113274 A1 | 7/2016 |

OTHER PUBLICATIONS

Shroud Guard, Oct. 18, 2016 (Year: 2016).*
Extended European Search Report dated Sep. 20, 2018 related to EP Patent Application No. 18169373.0.

*Primary Examiner* — David R Hare
*Assistant Examiner* — Adam C Ortiz
(74) *Attorney, Agent, or Firm* — Dinsmore & Shohl LLP

(57) ABSTRACT

A cladding protection unit for a column of an adjustable support apparatus includes a frame including a first portion configured to be magnetically coupled to a second portion so as to extend around a perimeter of the column. Each of the first portion and the second portion include a sidewall. The sidewall of the first portion of the frame and the sidewall of the second portion of the frame form a column receiving space when the first portion is magnetically coupled to the second portion. A standoff flange extends outward from the sidewall. One or more magnets are coupled to at least one of the first and second portions of the frame. When the cladding protection unit is positioned around a perimeter of the column, the column is positioned in the column receiving space of the frame and the standoff flange of the frame extends outward from a perimeter of the column.

20 Claims, 7 Drawing Sheets

(56) References Cited

U.S. PATENT DOCUMENTS

| | | | |
|---|---|---|---|
| 10,610,435 B2* | 4/2020 | Allen | A61G 13/101 |
| 2003/0190189 A1 | 10/2003 | Roller et al. | |
| 2007/0116515 A1 | 5/2007 | Woytowich et al. | |
| 2009/0126112 A1 | 5/2009 | Kuchenbecker et al. | |
| 2009/0321604 A1* | 12/2009 | Revenus | F16P 1/00 248/354.1 |
| 2015/0335512 A1 | 11/2015 | Langford | |
| 2016/0000623 A1 | 1/2016 | Koch | |

* cited by examiner

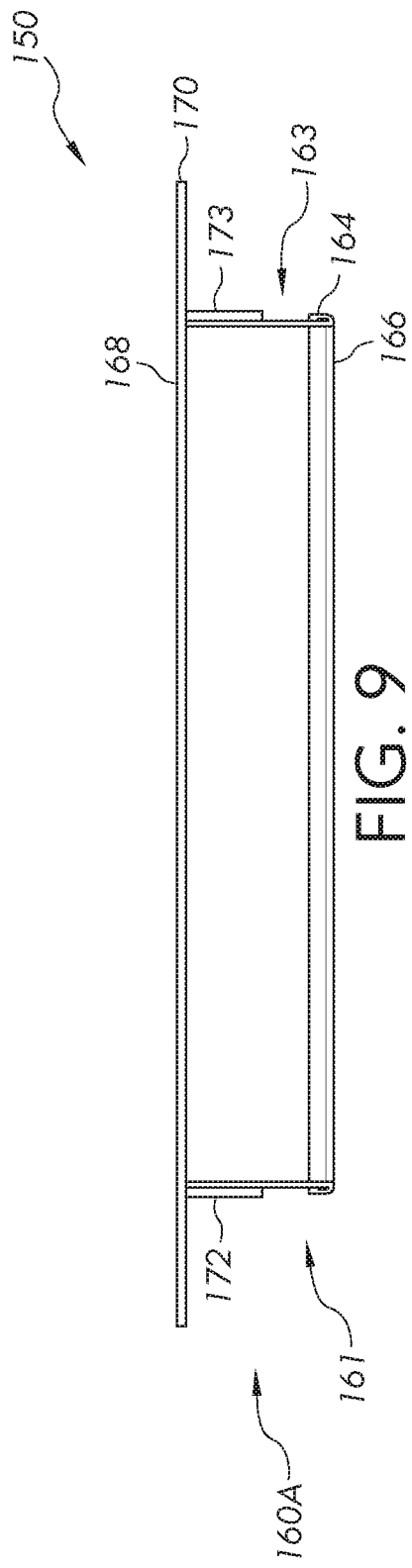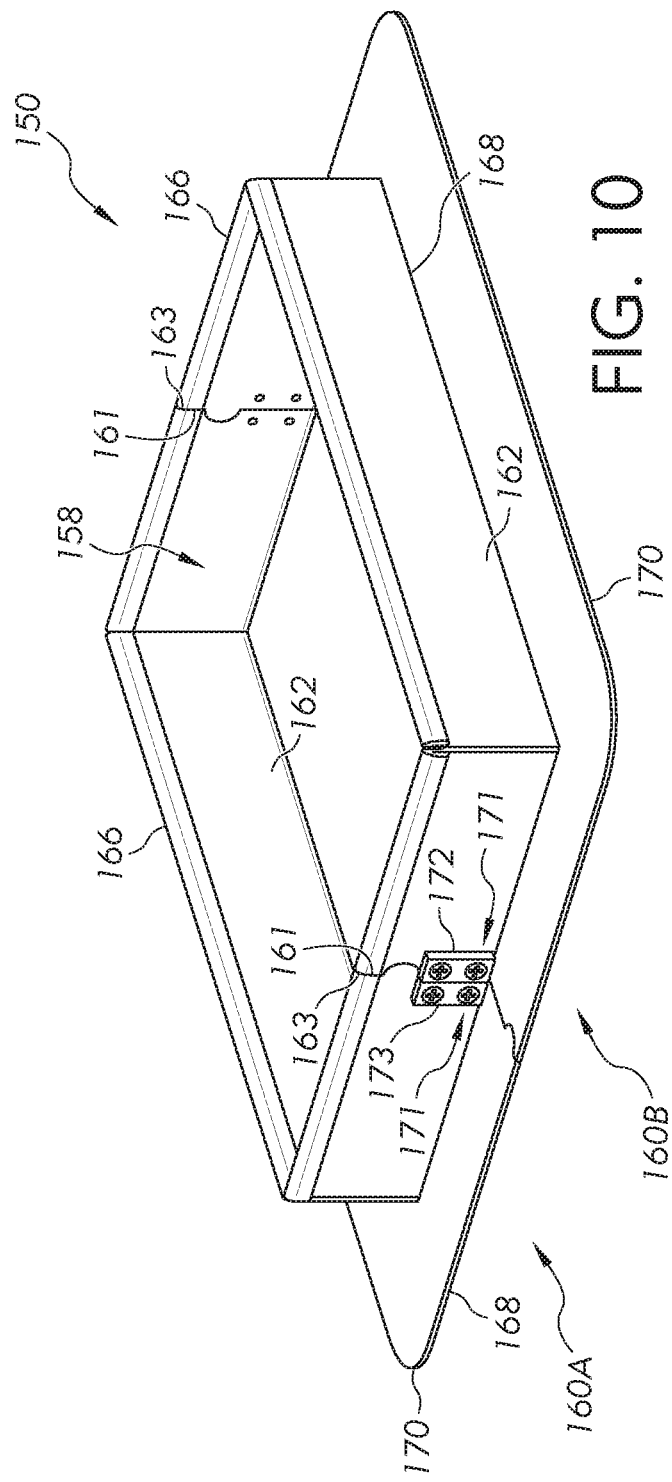

CLADDING PROTECTION UNITS FOR TELESCOPING COLUMNS AND ADJUSTABLE SUPPORT APPARATUSES

CROSS-REFERENCE TO RELATED APPLICATION

This application claims the benefit of priority to U.S. Provisional Application Ser. No. 62/491,696, filed Apr. 28, 2017.

TECHNICAL FIELD

The present specification generally relates to cladding protection units, and, more specifically, to cladding protection units for telescoping columns and adjustable support apparatuses.

BACKGROUND

Adjustable support apparatuses such as those for supporting a patient may include an adjustable column to facilitate adjusting the height or orientation of the adjustable support apparatus. However, placing items beneath the adjustable support apparatus may hinder the adjustability of the adjustable support apparatus and/or cause damage to the cladding of the adjustable column.

Accordingly, a need exists for cladding protection units for adjustable support apparatuses.

SUMMARY

In one embodiment, a cladding protection unit for a column of an adjustable support apparatus includes a frame including a first portion configured to be magnetically coupled to a second portion so as to extend around a perimeter of the column. Each of the first portion and the second portion include a sidewall, the sidewall of the first portion of the frame and the sidewall of the second portion of the frame forming a column receiving space when the first portion is magnetically coupled to the second portion, and a standoff flange extending outward from the sidewall. The cladding protection unit further includes one or more magnets coupled to at least one of the first portion and the second portion of the frame to magnetically couple the first portion to the second portion, wherein, when the cladding protection unit is positioned around a perimeter of the column of the adjustable support apparatus, the column is positioned in the column receiving space of the frame and the standoff flange of the frame extends outward from a perimeter of the column.

In another embodiment, a telescoping column assembly includes a telescoping column and a cladding protection unit encircling a perimeter of the telescoping column. The telescoping column includes a plurality of nestable cassettes. The plurality of nestable cassettes include a base cassette, at least one intermediate cassette coupled to the base cassette, and a master cassette coupled to the at least one intermediate cassette. A projected perimeter of the master cassette circumscribes a perimeter of the at least one intermediate cassette and a projected perimeter of the at one least intermediate cassette circumscribes a perimeter of the base cassette such that the base cassette is nestable within the at least one intermediate cassette and the at least one intermediate cassette is nestable within the master cassette. The cladding protection unit includes a sidewall forming a column receiving space and a standoff flange extending from the sidewall away from the column receiving space. A projected perimeter of the standoff flange circumscribes the perimeter of the master cassette.

In yet another embodiment, an adjustable support apparatus includes a base, a table top assembly, a telescoping column positioned on the base and supporting the table top assembly on the base, and a cladding protection unit positioned on the base and encircling a perimeter of the telescoping column. The telescoping column includes a plurality of nestable cassettes. The plurality of nestable cassettes include a base cassette supported on the base, at least one intermediate cassette coupled to the base cassette, and a master cassette coupled to the table top assembly and the at least one intermediate cassette. A projected perimeter of the master cassette circumscribes a perimeter of the at least one intermediate cassette and a projected perimeter of the at one least intermediate cassette circumscribes a perimeter of the base cassette such that the base cassette is nestable within the at least one intermediate cassette and the at least one intermediate cassette is nestable within the master cassette. The cladding protection unit includes a sidewall forming a column receiving space and a standoff flange extending from the sidewall away from the column receiving space. A projected perimeter of the standoff flange circumscribes the perimeter of the master cassette.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9 depicts a side view of the cladding protection unit of FIG. 6, according to one or more embodiments shown and described herein; and FIG. 10 depicts a standoff flange side down perspective view of the cladding protection unit of FIG. 6, according to one or more embodiments shown and described herein.

DETAILED DESCRIPTION

Embodiments disclosed herein include cladding protection units, telescoping columns, and adjustable support apparatuses. A cladding protection unit according to the present disclosure includes a frame configured to surround a column of an adjustable support apparatus. The frame includes a sidewall that forms a column receiving space and a standoff flange extending outward from the sidewall. The standoff flange may extend outward from the column so as to discourage the placement of objects proximate to the column that may interfere with the adjustability of the adjustable support apparatus or damage the column. Various embodiments of cladding protection units, telescoping columns, and adjustable support apparatuses are described in detail below.

Figure 1A:
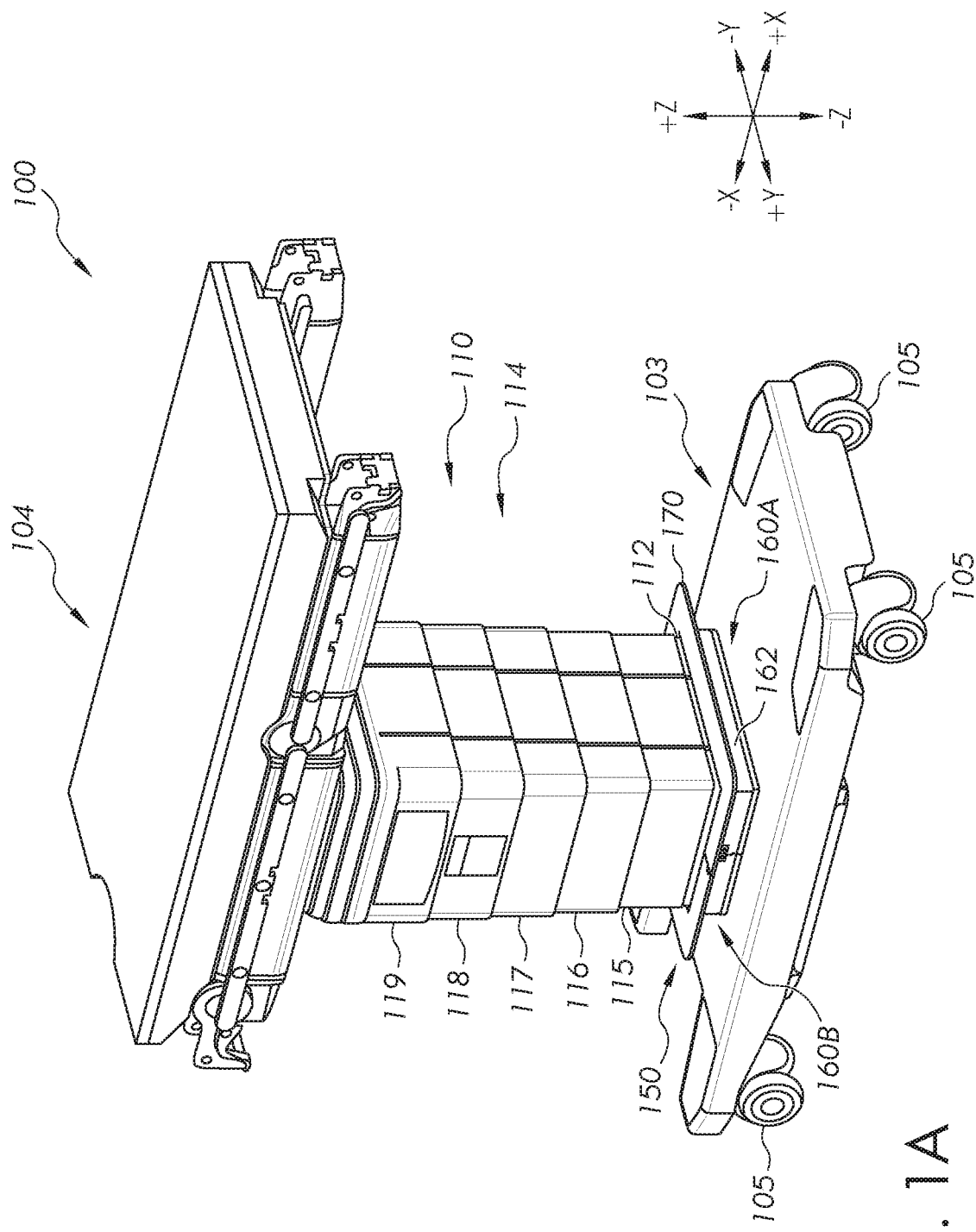
FIG. 1A depicts a perspective view of an adjustable support apparatus in an extended configuration with a cladding protection unit, according to one or more embodiments shown and described herein.

Referring now to FIG. 1A, a perspective view of an adjustable support apparatus 100 is generally depicted. In this embodiment, the adjustable support apparatus 100 may be, for example and without limitation, a single column operating table (i.e., surgical table) such as the TruSystem® 7000 series or 7500 series of operating room tables manufactured by TRUMPF Medizin Systeme GmbH+Co. KG of Saalfeld, Germany or a MARS™ OR Table or SATURN® OR Table, each of which is also manufactured by TRUMPF Medizin Systeme GmbH+Co. KG of Saalfeld, Germany. The adjustable support apparatus 100 includes a telescoping column 110, a base 103, and a table top assembly 104. The base 103 may include a plurality of casters 105 such that the adjustable support apparatus 100 may be moved along a surface such as a floor. The telescoping column 110 is positioned on and supported by the base 103. The table top assembly 104 may be configured to support a patient thereon and is positioned on and supported by the telescoping column 110. In some embodiments, the table top assembly 104 is selectively removable from the telescoping column 110. As such, the telescoping column 110 may be adapted to have a table top assembly 104 affixed thereto and removed therefrom. Similarly, in some embodiments, the base 103 may be adapted to have a telescoping column 110 affixed thereto and removed therefrom. Accordingly, it should be understood that the telescoping column 110 may be an assembly separate and distinct from the base 103 and the table top assembly 104.

Figure 1B:
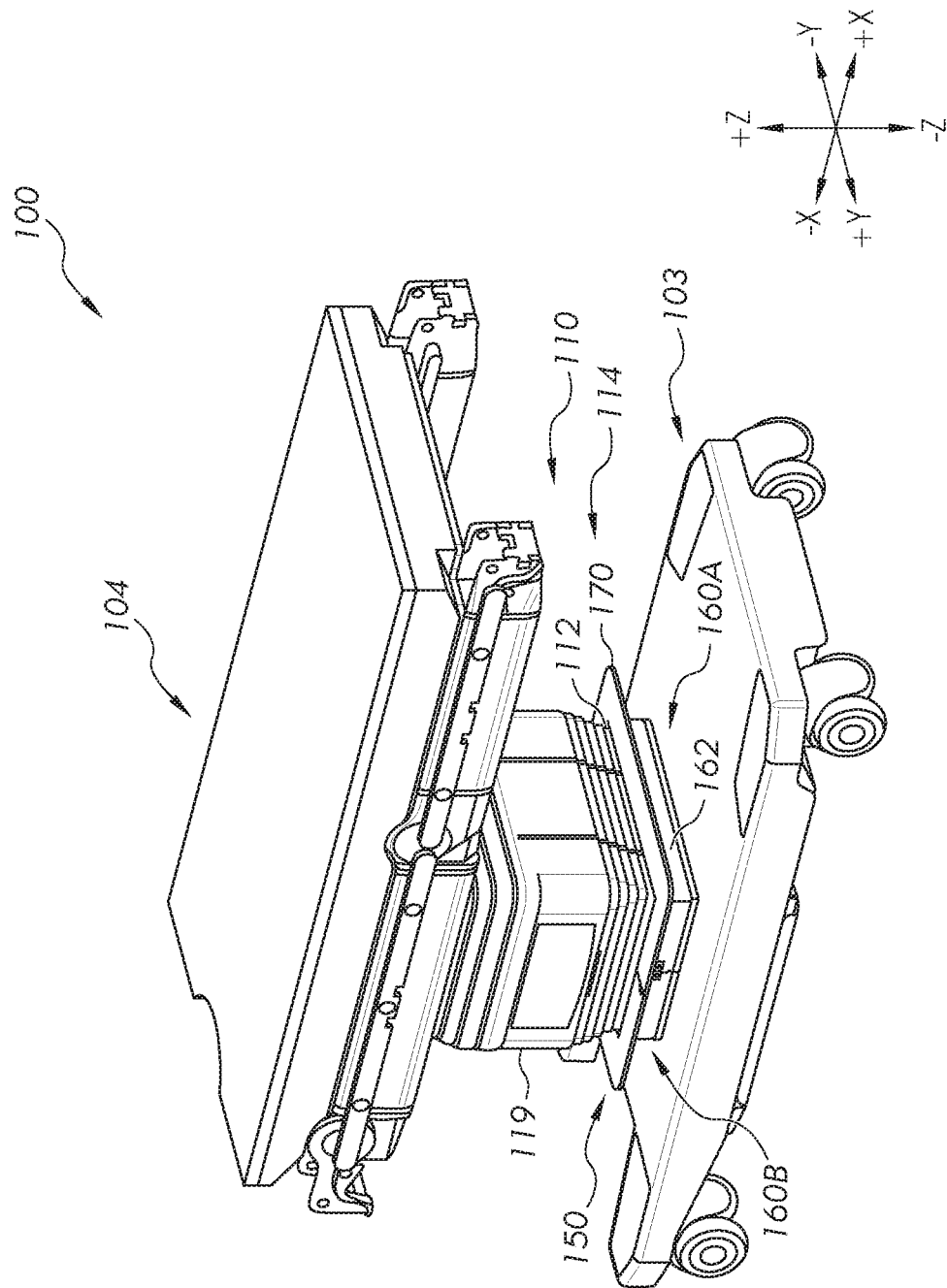
FIG. 1B depicts a perspective view of the adjustable support apparatus of FIG. 1A in a retracted configuration, according to one or more embodiments shown and described herein.
Figure 3:
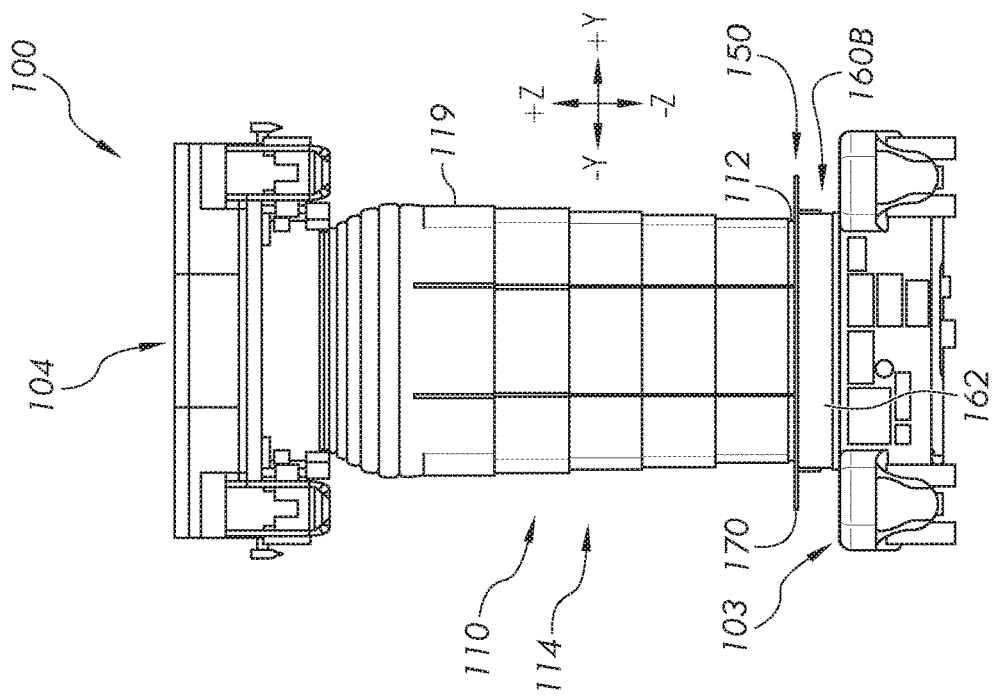
FIG. 3 depicts a rear view of the adjustable support apparatus of FIG. 1A, according to one or more embodiments shown and described herein.
Figure 2:
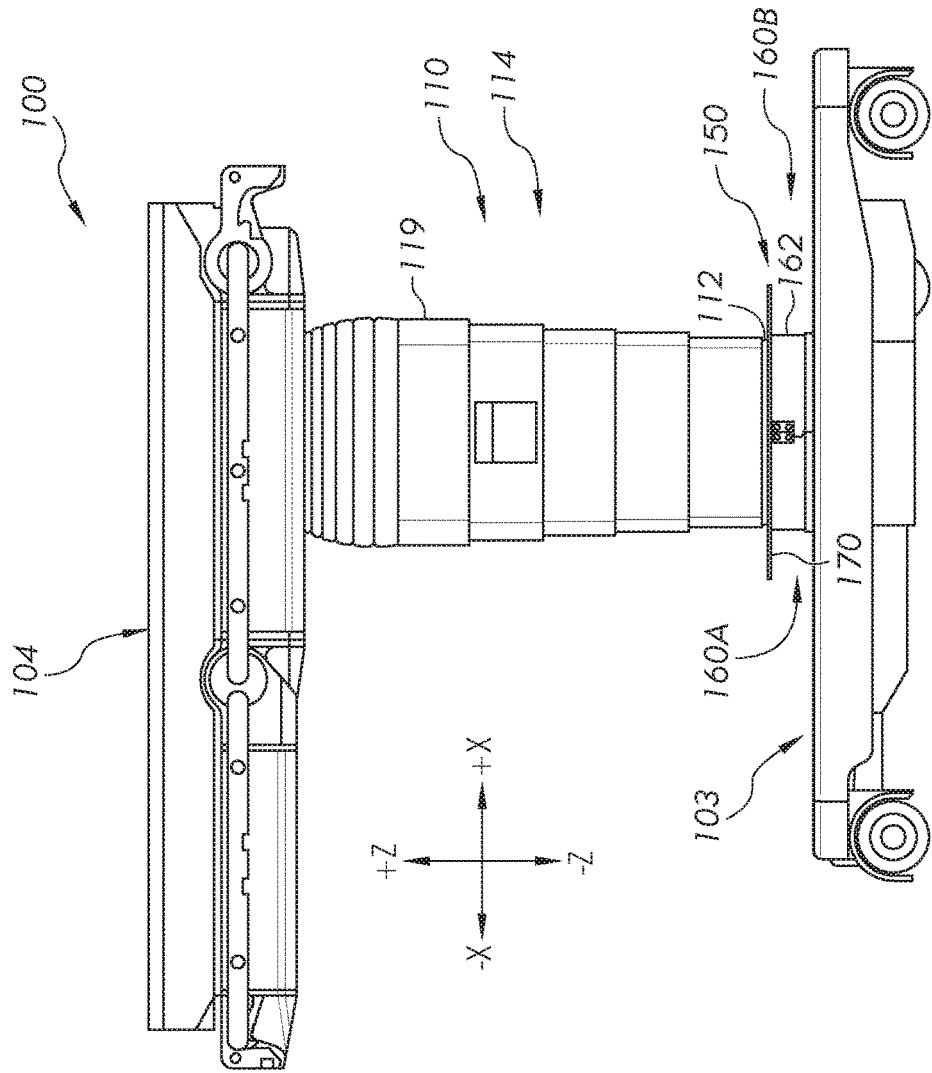
FIG. 2 depicts a side view of the adjustable support apparatus of FIG. 1A, according to one or more embodiments shown and described herein.

The telescoping column 110 includes an adjustment system (not shown) for raising and lowering the table top assembly 104 relative to the base 103 and/or tilting the table top assembly 104 relative to the base 103. For example, FIG. 1A illustrates the telescoping column 110 in an extended configuration. Referring now to FIG. 1B, the telescoping column 110 is shown in a retracted configuration. In some embodiments the adjustment system may facilitate rotating the table top assembly 104 about an axis generally parallel with the +/− Z axis depicted in FIG. 1A, rotating the table top assembly 104 about an axis generally parallel with the +/− Y axis depicted in FIG. 1A, and/or, rotating the table top assembly 104 about an axis generally parallel with the +/− X axis depicted in FIG. 1A. In embodiments, the adjustment system may be a mechanical adjustment system, an electromechanical adjustment system, a hydraulic adjustment system, or combinations thereof. For example, the adjustment system may include a spindle mechanism that is driven by an electric motor for raising and lowering the telescoping column 110. The adjustment system may be positioned within the telescoping column 110.

Referring to FIGS. 1A-3, to facilitate vertically raising and lowering the table top assembly 104 relative to the base 103, the telescoping column 110 includes a base support 112 coupled to the base 103 and a plurality of nestable cassettes 114 (i.e., cassettes 115, 116, 117, 118, and 119 in FIG. 1A) extending between the base support 112 and the table top assembly 104. The base support 112 and the plurality of nestable cassettes 114 form a cladding (i.e., the exterior surface) of the telescoping column 110. The cladding encloses and conceals the adjustment system of the adjustable support apparatus 100. In embodiments, the cladding may be made from, for example, stainless steel or other suitable material capable of being washed and sterilized.

The plurality of nestable cassettes 114 are supported on the base support 112 and are actuatable, such as with the adjustment system, to extend and retract in a vertical direction relative to the base support 112. For example, a base cassette 115 is directly engaged with the base support 112 and is configured to slide over a perimeter of the base support 112 in a +Z direction when the column is transitioning to an extended position, as illustrated in FIG. 1A, and in a −Z direction when the telescoping column 110 is transitioning to a retracted position, as illustrated in FIG. 1B. A first intermediate cassette 116 may be directly engaged with the base cassette 115 and is configured to slide over a perimeter of the base cassette 115 in a +Z direction when the column is transitioning to an extended position, as illustrated in FIG. 1A, and in a −Z direction when the telescoping column 110 is transitioning to a retracted position, as illustrated in FIG. 1B. Subsequent intermediate cassettes 117, 118 may be similarly engaged with each preceding cassette until a master cassette 119 is reached. In this way, each consecutive cassette of the plurality of nestable cassettes 114 may have a greater perimeter compared to the immediately preceding cassette.

A master cassette 119 may be the last cassette of the plurality of nestable cassettes 114, and may have the largest perimeter of the plurality of cassettes 114. The master cassette 119 may similarly be engaged with and move relative to an immediately preceding intermediate cassette 118 as described above with respect to the base cassette 115 and the first intermediate cassette 116. For example, the master cassette 119 is coupled to the underside of the table top assembly 104 and is directly engaged with an immediately preceding intermediate cassette 118 and is configured to slide over an outer surface of the immediately preceding intermediate cassette 118 in a +Z direction when the column is transitioning to an extended position, as illustrated in FIG. 1A, and in a −Z direction when the telescoping column 110 is transitioning to a retracted position, as illustrated in FIG. 1B. Accordingly, it should be understood that, when the telescoping column 110 is in the retracted position, the base cassette 115 is nested within the intermediate cassette 116, the intermediate cassette 116 is nested within the intermediate cassette 117, and so forth.

Each cassette of the plurality of nestable cassettes 114 may be coupled with the immediately preceding cassette through a variety of conventional coupling techniques including, but not limited to, interference structures, hooks, pins, and the like. For example and without limitation, in one embodiment, the intermediate cassette 116 may contain a flange (not shown) that extends from the top edge of the intermediate cassette 116 inward, towards the center of the telescoping column 110. The intermediate cassette 117 may have a corresponding flange (not shown) that extends from the bottom edge of the intermediate cassette 117 outward, away from the center of the telescoping column 110. The intermediate cassette 116 and the intermediate cassette 117 may also be coupled to the adjustment system such that the intermediate cassette 116 and the intermediate cassette 117 are raised or lowered with the table top assembly 104. As the table top assembly 104 is raised, for example, the flange of the intermediate cassette 116 engages with the corresponding flange of the intermediate cassette 117, drawing the intermediate cassette 116 over the base cassette 115. Each adjacent pair of adjacent cassettes in the plurality of nestable cassettes 114 may be similarly coupled to facilitate the "telescoping" effect of the telescoping column 110.

Figure 5:
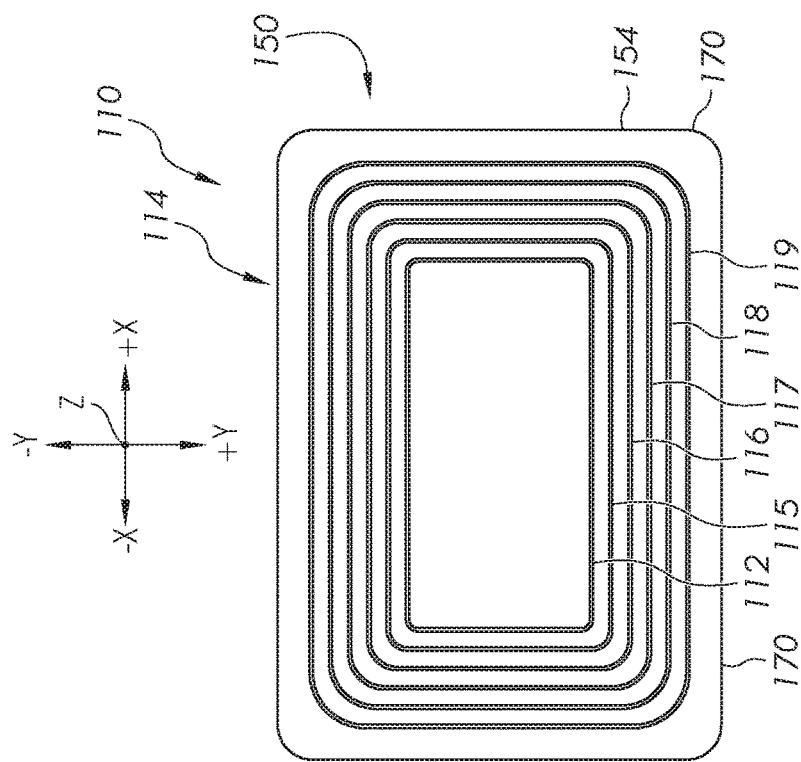
FIG. 5 schematically depicts a top view of the telescoping column and cladding protection unit of FIG. 4, according to one or more embodiments shown and described herein.
Figure 4:
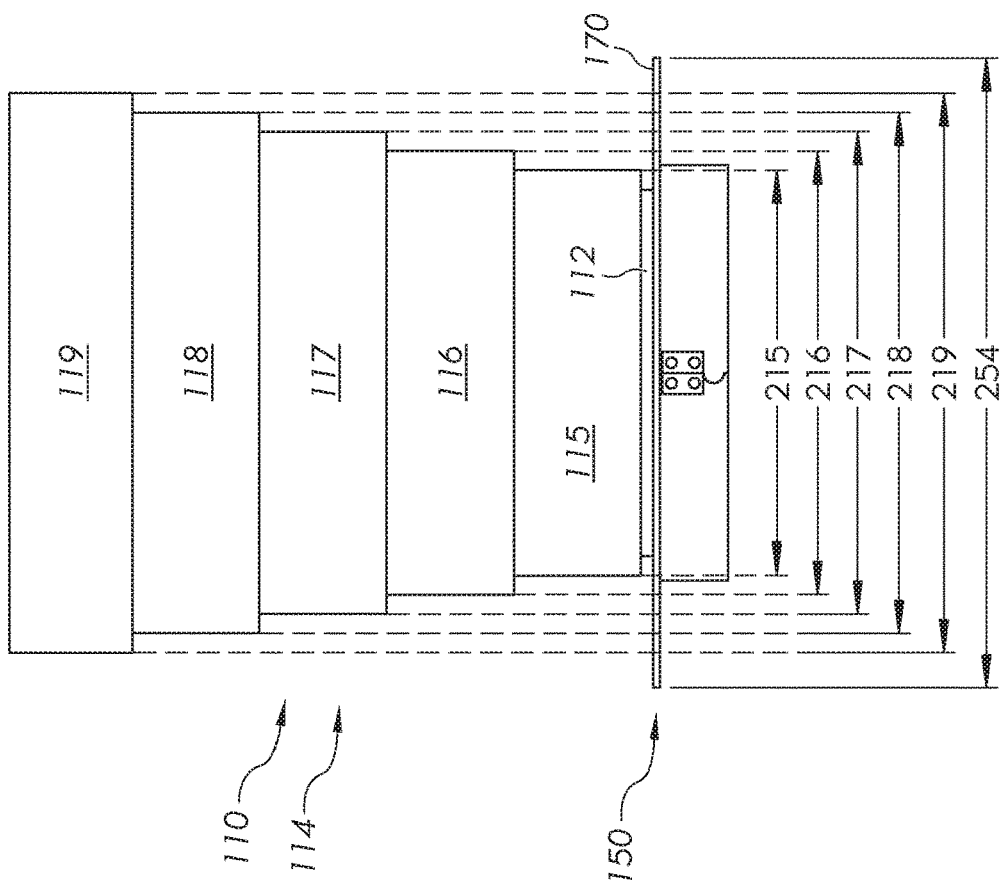
FIG. 4 schematically depicts a side view of a telescoping column and cladding protection unit in isolation, according to one or more embodiments shown and described herein.

This telescoping effect is also enabled by the relative dimensions of each of the cassettes of the plurality of nestable cassettes 114. As noted above, a perimeter of each consecutive nestable cassette of the plurality of nestable cassettes 114 may increase from the base support 112 in the +Z direction. As such, the master cassette 119 may define a largest perimeter of the plurality of nestable cassettes 114. Referring now to FIG. 4 by way of example, a schematic side view of the telescoping column 110 is illustrated. It is noted that the dimensions of the various cassettes have been exaggerated to better illustrate the consecutively increasing perimeter of each cassette. In the illustrated example, a projected perimeter 219 of the master cassette 119 circumscribes a perimeter of the at least one intermediate cassette (e.g., cassette 116, 117, and/or 118) and a projected perimeter (e.g., projected perimeter 216, 217, and/or 218) of the at one least intermediate cassette circumscribes a perimeter of the base cassette 115 such that the base cassette 115 is nestable within the at least one intermediate cassette and the at least one intermediate cassette is nestable within the master cassette 119. More specifically, the projected perimeter 219 of master cassette 119 circumscribes a perimeter of intermediate cassette 218; a projected perimeter 218 of intermediate cassette 118 circumscribes a perimeter of intermediate cassette 117; a projected perimeter 217 of intermediate cassette 117 circumscribes a perimeter of first intermediate cassette 116; a projected perimeter 216 of first intermediated cassette 116 circumscribes a perimeter of base cassette 115; and a projected perimeter 215 of base cassette 115 circumscribes a perimeter of the base support 112. FIG. 5 schematically illustrates a top view of the telescoping column 110 to further illustrate the consecutively increasing perimeters of each cassette of the plurality of nestable cassettes 114 from the base cassette 115 to the master cassette 119 and the relative orientations of the perimeter of each cassette with respect to one another.

It is noted that though the telescoping column 110 is illustrated as having five cassettes, the plurality of nestable cassettes 114 may contain more or fewer cassettes. In the embodiments described herein, the telescoping column 110 includes at least the base cassette 115, the master cassette 119, and at least one intermediate cassette (e.g., 116, 117, and/or 118) positioned between the base cassette 115 and the master cassette 119. It is further noted that though the perimeters of the cassettes of the plurality of nestable cassettes 114 are illustrated generally as quadrilaterals, it is contemplated that the perimeters of the cassettes may be any shape wherein each consecutive cassette is nestable within the immediately preceding cassette. For example, in some embodiments, the cassettes include perimeters that are round, triangular, octagonal, irregular, etc.

As the telescoping column 110 is actuated to increase and decrease in height, objects positioned within the vicinity of the telescoping column 110 may catch on or otherwise interfere with the movement of the plurality of nestable cassettes 114. For example, if an object were placed on the base 103 of the adjustable support apparatus 100 and in direct contact with the outer surface of the base cassette 115, the object may interfere with the telescoping action of the telescoping column 110. That is, the object may, for example, prevent the base cassette 115 from being nested within the intermediate cassette 116 when the telescoping column 110 is moved from the extended configuration to the retracted configuration. Such interference would prevent operation of the telescoping column 110 and could lead to damage to the telescoping column 110 and/or the adjustment system. As will be described in greater detail herein, a cladding protection unit 150 is placed around the telescoping column 110 to prevent placement of objects within the vicinity of the plurality of nestable cassettes 114 without disturbing the ability of the telescoping column 110 to fully extend and retract.

Referring again to FIG. 1A, the cladding protection unit 150 is positioned on the base 103 and is removably coupled around a perimeter of the telescoping column 110. In some embodiments, the cladding protection unit 150 is removably coupled around the perimeter of the telescoping column 110 as defined by the base support 112 of the telescoping column 110. In such embodiments, the cladding protection unit 150 may be sized to fit around the base support 112 beneath the base cassette 115 when the base cassette 115 is in its lowest retracted position (see FIG. 1B). In this way, the cladding protection unit 150 may fit around the base support 112 of the telescoping column 110 without interfering with the vertical raising and lowering of the plurality of nestable cassettes 114. For example, and not as a limitation, the cladding protection unit 150 may have a height in the +Z direction between about 50 mm and 100 mm (e.g., about 62 mm). However, larger and smaller heights are also contemplated. In some embodiments, the cladding protection unit 150 may be sized to fit around the base support 112 and at least the base cassette 115 when the base cassette 115 is in its lowest retracted position such that the base cassette 115 is nestable within a column receiving space 158 (shown in FIGS. 6 and 7) of the cladding protection unit 150. Stated another way, a projected perimeter (not shown) of the column receiving space 158 may circumscribe the perimeter of the base cassette 115 such that at least the base cassette 115 is nestable within the column receiving space 158. The cladding protection unit 150 may be made from, for example, stainless steel sheet metal or other material capable of being washed and sterilized.

Figure 6:
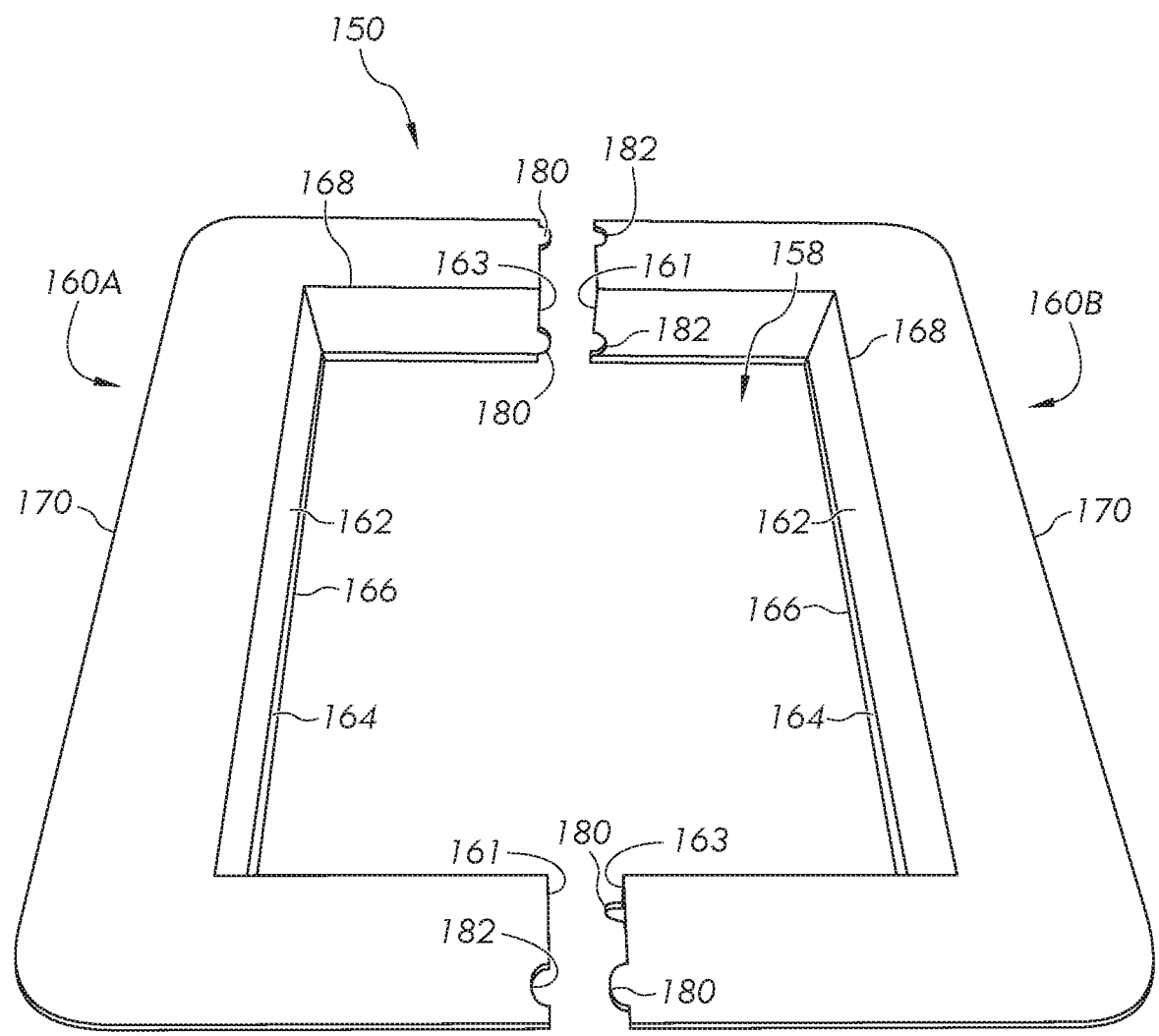
FIG. 6 depicts an top perspective view of a cladding protection unit in isolation, wherein the cladding protection unit is separated into a first portion and a second portion, according to one or more embodiments shown and described herein.

Referring now to FIG. 6, FIG. 6 illustrates a top perspective view of the cladding protection unit 150 in isolation from the telescoping column 110 and in a disassembled state (i.e., the first portion 160A is uncoupled from the second portion 160B). The cladding protection unit 150 generally includes a frame 152 and a standoff flange 170. In embodiments, the frame 152 defines and at least partially encloses a column receiving space 158 in which the telescoping column 110 may be positioned. The standoff flange 170 generally extends from the frame 152 away from the column receiving space 158. In embodiments, the frame 152 and standoff flange 170 may be formed as a unitary construct (not shown), such as when the frame 152 is formed as a closed loop around the column receiving space 158 and the standoff flange 170 is welded or integrally formed with the frame 152. However, it should be understood that, in other embodiments, the standoff flange 170 and frame 152 may be a multi-part construct, as depicted in FIG. 6.

For example, in embodiments, the frame 152 of the cladding protection unit 150 may include at least a first portion 160A and a second portion 160B that are separable from one another. When the first portion 160A and the second portion 160B of the frame 152 are combined, the first portion 160A and the second portion 160B enclose the column receiving space 158 such that the frame 152 extends around a perimeter of the telescoping column 110, as depicted in FIGS. 1A-5, when the telescoping column 110 is positioned in the column receiving space 158. Referring again to FIG. 6, by providing a frame 152 that is separable into at least a first portion 160A and a second portion 160B, the cladding protection unit 150 may be easily placed around and removed from around the telescoping column 110. For example, when the cladding protection unit 150 is assembled around the telescoping column 110, by disconnecting the first portion 160A from the second portion 160B, each of the first portion 160A and the second portion 160B may be removed from around the telescoping column 110 to facilitate, for example, cleaning and sanitizing the cladding protection unit 150 and/or the telescoping column 110.

In the embodiment of the cladding protection unit 150 depicted in FIG. 6, each of the first and second portions 160A, 160B may make up approximately one half of the cladding protection unit 150. However, it is contemplated that in other embodiments the first and second portions 160A, 160B may not make up equal portions of the cladding protection unit 150. In some embodiments, the first portion 160A may be substantially identical to the second portion 160B. By making the first portion 160A and the second portion 160B substantially identical to one another, manufacture of the cladding protection unit 150 may be simplified. For example, and as will be described in greater detail herein, both the first portion 160A and the second portion 160B may include the same elements, but when combined, one of the first portion 160A and the second portion 160B is rotated so as to be the reverse orientation of the other portion. Hence, only one of the first portion 160A and the second portion 160B need be repeatedly manufactured to produce a cladding protection unit 150. This may simplify manufacturing and reduce associated costs. In the following description, substantially identical elements of the first and second portions 160A, 160B are described using the same reference numerals.

Figure 7:
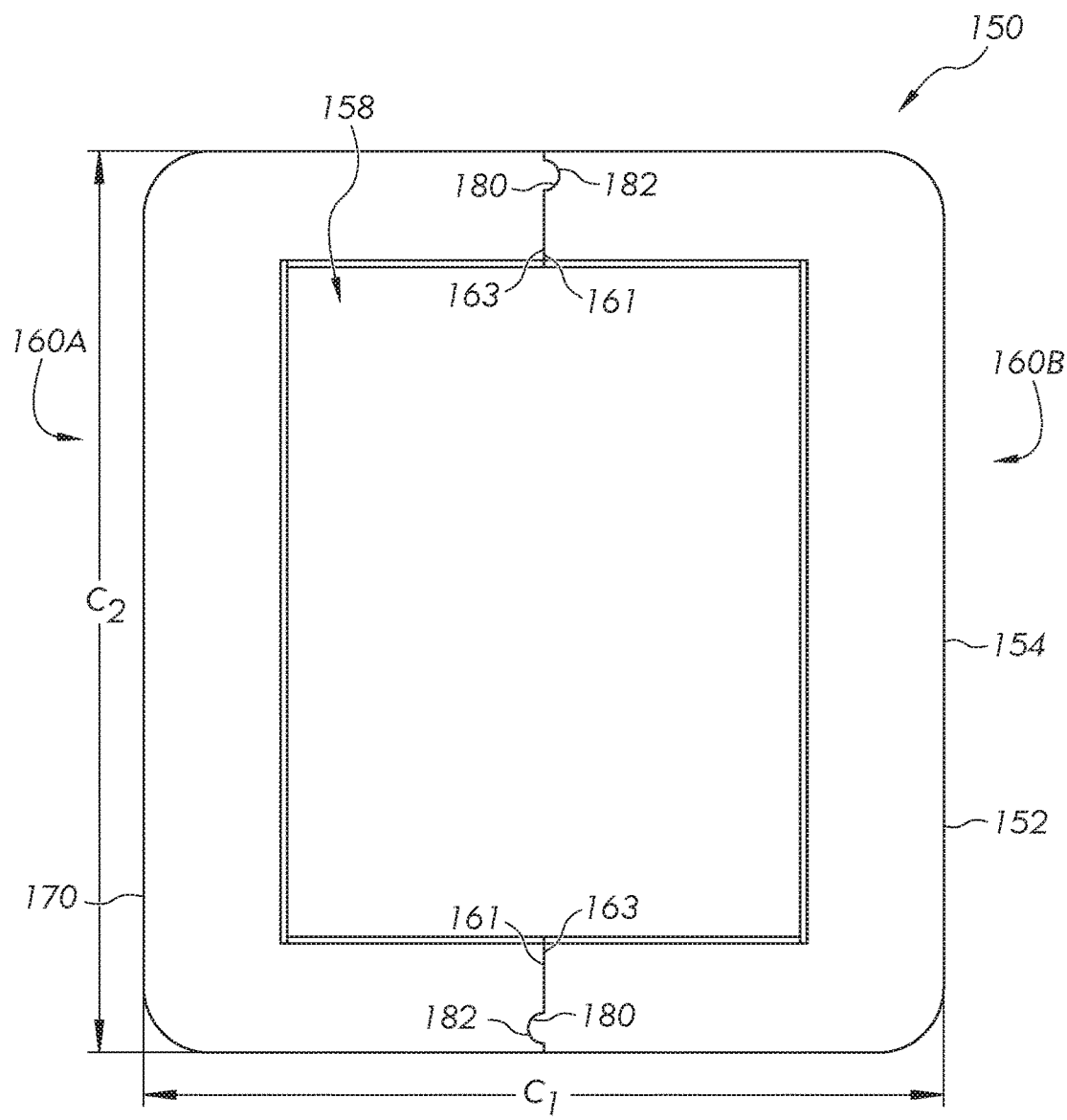
FIG. 7 depicts a top view of the cladding protection unit of FIG. 6 in an assembled configuration, according to one or more embodiments shown and described herein.

Each of the first and second portions 160A, 160B includes a first end 161 and a second end 163 spaced apart from the first end 161. FIG. 7 illustrates, in isolation, a top view of the cladding protection unit 150 in an assembled state. As illustrated, the first end 161 of the first portion 160A may be configured to be coupled to the second end 163 of the second portion 160B. Similarly, the second end 163 of the first portion 160A may be configured to be coupled to the first end 161 of the second portion 160B. As will be described in greater detail, the first and second portions 160A, 160B may be coupled to one another through a variety of fastening techniques that allow for the cladding protection unit 150 to be readily assembled and disassembled. For example, and as will be described in greater detail, in some embodiments, the first portion 160A may be configured to be magnetically coupled to the second portion 160B.

It is noted that though the cladding protection unit 150 and the column receiving space 158 are illustrated as quadrilaterals, it is contemplated that the cladding protection unit 150 may be any shape generally corresponding to the shape of the base support 112 of the telescoping column 110. In some embodiments, the shape of the cladding protection unit 150 may not correspond directly with the contours of the telescoping column 110.

Figure 8:
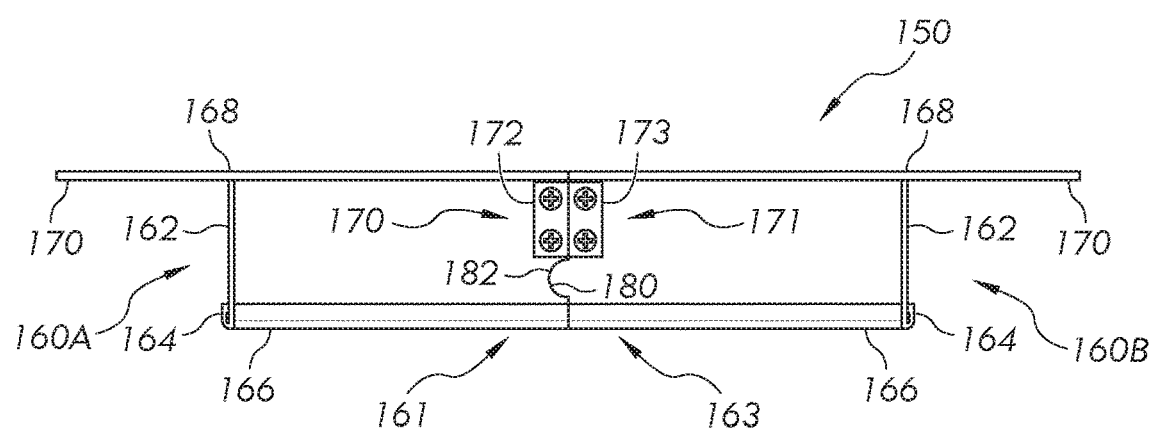
FIG. 8 depicts a front view of the cladding protection unit of FIG. 6, according to one or more embodiments shown and described herein.

Referring collectively to FIGS. 7-10, FIG. 7 illustrates a top view of the assembled cladding protection 150 unit, FIG. 8 illustrates a front view of the assembled cladding protection unit 150, FIG. 9 illustrates a side view of the assembled cladding protection unit 150, and FIG. 10 illustrates an upside-down perspective view of the assembled cladding protection unit 150. Each of the first portion 160A and the second portion 160B of the frame 152 of the cladding protection unit 150 includes a sidewall 162. Referring briefly to FIGS. 1A-3, the sidewall 162 may extend substantially parallel in the +Z direction to the base support 112 of the telescoping column 110. In some embodiments, the sidewall 162 may be positioned proximate to the outer surface of the base support 112 when the cladding protection unit 150 is assembled around the telescoping column 110. In some embodiments, the sidewall 162 may positioned in contact with the base support 112 of the telescoping column 110 when the cladding protection unit 150 is assembled around the telescoping column 110.

In an optional embodiment, a resilient material 164 (e.g., plastic, foam, rubber, etc.) may be applied to the base portion 166 of the sidewall 162. The resilient material 164 may extend up a portion of the sidewall 162 on either side of the sidewall 162. The resilient material 164 may provide a smooth edge for sliding the first and second portions 160A, 160B of the cladding protection unit 150 along the base 103 of the adjustable support apparatus 100, as illustrated in FIGS. 1A-3. The resilient material 164 may further provide a protective barrier between the cladding protection unit 150 and the base 103 of the adjustable support apparatus 100 to minimize scratching that may otherwise be caused to the base 103 of the adjustable support apparatus 100 when the cladding protection unit 150 is slid into place around the base support 112 of the telescoping column 110. In some embodiments, there may be no resilient material 164 added to the base portion 166 of the sidewall 162.

Referring to FIGS. 6-10, the cladding protection unit 150 further comprises a standoff flange 170, as described herein. In the embodiments described herein, the standoff flange 170 extends from the sidewall 162 away from the column receiving space 158. In embodiments, the standoff flange 170 may be positioned at a top 168 of the sidewall 162 located opposite of the base portion 166, as depicted in the figures. In some other embodiments, the standoff flange 170 may extend outward from the sidewall 162 at a position between the top 168 and the base portion 166.

Referring now to FIGS. 5 and 7, when the cladding protection unit 150 is assembled, the standoff flange 170 defines an outer perimeter 154 of the cladding protection unit 150. The standoff flange 170 may be coupled to the sidewall 162 of the first and second portions 160A, 160B through any conventional joining technique (e.g., fasteners, adhesives, welding, and the like) or may be integrally formed with the sidewall 162. The material of the standoff flange 170 may have a substantially constant thickness. For example, the standoff flange 170 of the cladding protection unit 150 may have thickness from about 1 mm to about 5 mm (e.g., about 2 mm). In some embodiments, the material of the sidewall 162 has the same thickness as the standoff flange 170. It is noted that though the standoff flange 170 is illustrated as extending from the sidewall 162 at a substantially perpendicular orientation relative to the sidewall 162, it is also contemplated the that the standoff flange 170 may extend from the sidewall 162 at an oblique angle relative to the sidewall 162.

Referring now to FIGS. 1A and 4, when the cladding protection unit 150 is positioned around the telescoping column 110 the standoff flange 170 is vertically spaced apart from the base 103 of the adjustable support apparatus 100. A projected perimeter 254 of the standoff flange 170, which corresponds to the outer perimeter 154 of the standoff flange 170 illustrated in FIGS. 5 and 7, circumscribes a perimeter of the master cassette 119 (see projected perimeter 219). See also, FIG. 5, which illustrates that the outer perimeter 154 of the cladding protection unit is larger than a perimeter of the master cassette 119. The standoff flange 170 in the illustrated embodiments extends on all sides of the telescoping column 110. However, it is contemplated that, in some embodiments, the standoff flange 170 may not extend on all sides of the telescoping column 110 but may instead be intermittent along the perimeter 154 of the cladding protection unit 150. Accordingly, the standoff flange 170 may act as a deterrent to placing objects too close to the plurality of nestable cassettes 114 of the telescoping column 110. Specifically, the standoff flange 170 prevents objects from being placed close enough to the telescoping column 110 to interfere with the plurality of nestable cassettes 114 as the table top assembly 104 is raised and lowered. The standoff flange 170 may extend far enough from the sidewall 162 to be a deterrent to placing objects too close to the telescoping column 110 while still allowing some of the space between the base 103 and the table top assembly 104 to be used. For example, wherein the adjustable support apparatus 100 is an operating table, medical equipment or the feet of a surgeon or other staff may be able to rest upon the base 103 without interfering with the cladding protection unit 150 or the telescoping column 110.

As noted herein, the first and second portions 160A, 160B of the cladding protection unit 150 may be magnetically coupled to one another. Referring again to FIGS. 8-10, one or more magnets 171 may be coupled to at least one of the first and second portions 160A, 160B of the frame 152 to magnetically couple the first portion 160A to the second portion 160B. The one or more magnets 171 may be positioned along an outer surface of the sidewall 162 proximate to the standoff flange 170 at at least one of the first end 161 and the second end 163 of the at least one of the first and second portions 160A, 160B. In some embodiments, both the first portion 160A and the second portion 160B may each include a magnet 171 with an opposite pole exposed from the other portion. For example, the first portion 160A could include a first magnet 172 with a positive pole exposed and the second portion 160B could include a second magnet 173 with a negative pole exposed. In some embodiments, the one or more magnets 171 may be located at both the first and second ends 161,163 of the first and second portions 160A, 160B. For example, the one or more magnets 171 for each of the first and second portions 160A, 160B may include a first magnet 172 located at one of the first end 161 and the second end 163 of each of the first and second portions 160A, 160B and a second magnet 173 located at the end 161 or 163 opposite the first magnet 172 of each of the first and second portions 160A, 160B. In such embodiments, the first magnet 172 coupled to the first portion 160A is configured to be magnetically coupled to the second magnet 173 coupled to the second portion 160B, and the first magnet 172 coupled to the second portion 160B is configured to be magnetically coupled to the second magnet 173 coupled to the first portion 160A.

The one or more magnets 171 may be coupled to the frame 152 of the cladding protection unit 150 in a variety of ways. For example, the one or more magnets 171 may be fastened to the sidewall 162 by threaded fasteners. Other conventional joining techniques include but are not limited to, soldering, brazing, adhesive bonding, and the like. In some embodiments, it is contemplated that the one or more magnets 171 may be coupled to a surface of the standoff flange 170. In some embodiments, the one or more magnets 171 may be coupled to the sidewall 162 and in contact with the standoff flange 170. It is further noted that by providing a magnetic coupling between the first portion 160A and the second portion 160B the cladding protection unit 150 may be easily cleaned and sterilized for sterile environments, such as, for example, an operating room.

It is noted that the standoff flange 170 may aid in decoupling the first portion 160A from the second portion 160B of the cladding protection unit 150. For example, pressing on the standoff flange 170 may provide leverage to overcome the magnetic attraction between the first portion 160A and the second portion 160B caused by the one or more magnets 171.

While magnetic coupling between the first portion 160A and the second portion 160B of the cladding protection unit 150 has been described, it should be understood that other embodiments are contemplated and possible. For example, in some embodiments the first portion 160A and the second portion 160B of the cladding protection unit 150 may be coupled with mechanical fasteners, mechanical latches, or the like.

In some embodiments, the first and second portions 160A, 160B may be configured to interlock with one another. For example, the first and second portions 160A, 160B may include one or more guiding members 180 and/or one or more receiving slots 182 configured to receive the one or more guiding members 180 of the opposite portion. In embodiments, the one or more guiding members 180 may be a protrusion extending from at least one of the first and second ends 161, 163 of at least one of the first and second portions 160A, 160B. The one or more receiving slots 182 may be a cutout positioned within at least one of the first and second ends 161, 163 of at least one of the first and second portions 160A, 160B. For example, the first portion 160A of the frame 152 may include one or more guiding members 180 and the second portion 160B may include one or more receiving slots 182 for receiving the one or more guiding members 180 of the first portion 160A. In some embodiments, each of the first portion 160A and the second portion 160B include one or more guiding members 180 and each of the first portion 160A and the second portion 160B include one or more receiving slots 182. As such, the one or more receiving slots 182 of the first portion 160A are configured to correspond with and receive the one or more guiding members 180 of the second portion 160B and the one or more receiving slots 182 of the second portion 160B are configured to correspond with and receive the one or more guiding members 180 of the first portion 160A.

The one or more guiding members 180 may include any geometry (e.g., semi-circular, rectangular, and the like) and size while the one or more receiving slots 182 may include an inverse geometry and size to match the geometry and size of the one or more guiding members 180. The one or more guiding members 180 and the one or more receiving slots 182 may provide a more secure coupling between the first portion 160A and the second portion 160B. Furthermore, the one or more guiding members 180 and the one or more receiving slots 182 may provide indications to a user of the appropriate orientation of the first portion 160A and the second portion 160B to couple the first portion 160A to the second portion 160B. The one or more guiding members 180 and the one or more receiving slots 182 may be laser cut, which may provide a more precise and seamless fit between the one or more guiding members 180 and the one or more receiving slots 182.

In the illustrated embodiment, the first ends 161 of the first and second portions 160A, 160B include two guiding members 180 wherein one guiding member 180 extends from the standoff flange 170 and the second guiding member 180 extends from the sidewall 162. Further, the second ends 163 of the first and second portions 160A, 160B include two receiving slots 182, wherein one receiving slot 182 is positioned within the standoff flange 170 and the other receiving slot 182 is positioned within the sidewall 162, beneath the magnet 171. In some embodiments, it is contemplated that the the one or more guiding members 180 and one or more guiding ports 182 may be positioned on only one of the standoff flange 170 or the sidewall 162.

It should now be understood that the cladding protection units described herein can be placed around the base of a telescoping column to discourage the placement of objects within a vicinity of the telescoping column. Specifically, the cladding protection unit may discourage the placement of objects near the telescoping column that could interfere with the extension or retraction of the various cassettes of the telescoping column and damage the cassettes. The cladding protection unit may be easily assembled and disassembled for cleaning and sterilization for use in operating rooms or other sterile environments.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cladding protection unit for a column of an adjustable support apparatus, the cladding protection unit comprising:
    a frame comprising a first portion and a second portion configured to be magnetically coupled to one another, wherein each of the first portion and the second portion comprise:
        a sidewall, the sidewall of the first portion of the frame and the sidewall of the second portion of the frame forming a column receiving space when the first portion is magnetically coupled to the second portion; and
        a standoff flange extending outward from the sidewall; and
    one or more magnets coupled to at least one of the first portion and the second portion of the frame to magnetically couple the first portion to the second portion, wherein, when the cladding protection unit is positioned around a perimeter of the column of the adjustable support apparatus, the column is positioned in the column receiving space of the frame and the standoff flange of the frame extends outward from the perimeter of the column.

2. The cladding protection unit of claim 1, wherein the standoff flange of the first portion and the standoff flange of the second portion define an outer perimeter of the cladding protection unit when the first portion of the frame is coupled to the second portion of the frame.

3. The cladding protection unit of claim 1, wherein the one or more magnets are positioned along an outer surface of the sidewall proximate to the standoff flange at at least one of a first end and a second end of the at least one of the first portion and the second portion.

4. The cladding protection unit of claim 1, wherein:
    the one or more magnets include a first magnet located at one of a first end and a second end of each of the first and second portions and a second magnet located at an end opposite the first magnet of each of the first and second portions; and
    the first magnet coupled to the first portion is configured to be magnetically coupled to the second magnet coupled the second portion and the first magnet coupled to the second portion is configured to be magnetically coupled to the second magnet coupled to the first portion.

5. The cladding protection unit of claim 1, wherein the sidewall includes a base portion and a top, wherein the standoff flange extends outward from the sidewall at the top of the sidewall.

6. The cladding protection unit of claim 1, wherein the first portion is configured to interlock with the second portion.

7. The cladding protection unit of claim 6, wherein each of the first portion and the second portion comprise one or more guiding members and each of the first portion and the second portion comprise one or more receiving slots, wherein the one or more receiving slots of the first portion are configured to receive the one or more guiding members of the second portion and the one or more receiving slots of the second portion are configured to receive the one or more guiding members of the first portion.

8. A telescoping column assembly comprising:
    a telescoping column comprising a plurality of nestable cassettes, the plurality of nestable cassettes comprising:
        a base cassette;
        at least one intermediate cassette coupled to the base cassette; and
        a master cassette coupled to the at least one intermediate cassette, wherein a projected perimeter of the master cassette circumscribes a perimeter of the at least one intermediate cassette and a projected perimeter of the at one least intermediate cassette circumscribes a perimeter of the base cassette such that the base cassette is nestable within the at least one intermediate cassette and the at least one intermediate cassette is nestable within the master cassette; and
    a cladding protection unit positioned encircling a perimeter of the telescoping column, the cladding protection unit comprising:
        a sidewall forming a column receiving space; and
        a standoff flange extending from the sidewall away from the column receiving space, wherein a projected perimeter of the standoff flange circumscribes the perimeter of the master cassette.

9. The telescoping column assembly of claim 8, wherein the cladding protection unit is separable into a first portion and a second portion.

10. The telescoping column assembly of claim 9, wherein the first portion of the cladding protection unit is magnetically coupled to the second portion of the cladding protection unit.

11. The telescoping column assembly of claim 9, wherein:
the first and second portions of the cladding protection unit each comprise a first end and a second end spaced apart from the first end; and
the cladding protection unit further comprises:
a first magnet located at one of the first end and the second end of the first portion and the second portion; and
a second magnet located at an end opposite the first magnet, and
wherein the first magnet coupled to the first portion is magnetically coupled to the second magnet coupled to the second portion and the first magnet coupled to the second portion is magnetically coupled to the second magnet coupled to the first portion.

12. The telescoping column assembly of claim 9, wherein:
the first portion comprises one or more guiding members and the second portion comprises one or more receiving slots; and
the one or more guiding members of the first portion correspond with the one or more receiving slots of the second portion.

13. The telescoping column assembly of claim 9, wherein:
each of the first portion and the second portion comprise one or more guiding members and one or more receiving slots;
the one or more guiding members of the first portion correspond to the one or more receiving slots of the second portion; and
the one or more guiding members of the second portion correspond to the one or more receiving slots of the second portion.

14. An adjustable support apparatus comprising:
a base;
a table top assembly;
a telescoping column positioned on the base and supporting the table top assembly on the base, the telescoping column comprising a plurality of nestable cassettes comprising:
a base cassette supported on the base;
at least one intermediate cassette coupled to the base cassette; and
a master cassette coupled to the table top assembly and the at least one intermediate cassette, wherein a projected perimeter of the master cassette circumscribes a perimeter of the at least one intermediate cassette and a projected perimeter of the at one least intermediate cassette circumscribes a perimeter of the base cassette such that the base cassette is nestable within the at least one intermediate cassette and the at least one intermediate cassette is nestable within the master cassette; and
a cladding protection unit positioned on the base and encircling a perimeter of the telescoping column, the cladding protection unit comprising:
a sidewall forming a column receiving space; and
a standoff flange extending from the sidewall away from the column receiving space, wherein a projected perimeter of the standoff flange circumscribes the perimeter of the master cassette.

15. The adjustable support apparatus of claim 14, wherein the cladding protection unit is separable into a first portion and a second portion.

16. The adjustable support apparatus of claim 15, wherein the first portion of the cladding protection unit is magnetically coupled to the second portion of the cladding protection unit.

17. The adjustable support apparatus of claim 15, wherein:
the first and second portions of the cladding protection unit each comprise a first end and a second end spaced apart from the first end; and
the cladding protection unit further comprises:
a first magnet located at one of the first end and the second end of the first portion and the second portion; and
a second magnet located at an end opposite the first magnet, and
wherein the first magnet coupled to the first portion is magnetically coupled to the second magnet coupled to the second portion and the first magnet coupled to the second portion is magnetically coupled to the second magnet coupled to the first portion.

18. The adjustable support apparatus of claim 17, wherein the first magnet and the second magnet coupled to each of the first portion and the second portion are located beneath and proximate to the standoff flange.

19. The adjustable support apparatus of claim 15, wherein:
the first portion comprises one or more guiding members and the second portion comprises one or more receiving slots; and
the one or more guiding members of the first portion correspond with the one or more receiving slots of the second portion.

20. The adjustable support apparatus of claim 15, wherein:
each of the first portion and the second portion comprise one or more guiding members and one or more receiving slots;
the one or more guiding members of the first portion correspond to the one or more receiving slots of the second portion; and
the one or more guiding members of the second portion correspond to the one or more receiving slots of the second portion.

* * * * *